United States Patent
Worrell (10) Patent No.: US 7,591,129 B2
(45) Date of Patent: Sep. 22, 2009

(54) ROTARY PISTON ENGINE

(76) Inventor: Kenneth Erwin Worrell, 2121 Poplar Ave., Apt-65A, Memphis, TN (US) 38104

( * ) Notice: Subject to any disclaimer, the term of this patent is extended or adjusted under 35 U.S.C. 154(b) by 444 days.

(21) Appl. No.: 11/320,292

(22) Filed: Dec. 29, 2005

(65) Prior Publication Data
US 2007/0151227 A1 Jul. 5, 2007

(51) Int. Cl.
*F02C 3/00* (2006.01)
(52) U.S. Cl. .................. 60/39.44; 60/39.35; 60/247
(58) Field of Classification Search ............... 60/39.44, 60/39.35, 247; 123/200, 212, 213
See application file for complete search history.

(56) References Cited

U.S. PATENT DOCUMENTS

| | | | |
|---|---|---|---|
| 1,687,511 A | 10/1928 | Powell | |
| 2,988,008 A | 6/1961 | Wankel | |
| 3,990,405 A * | 11/1976 | Kecik | ........................ 123/219 |
| 4,076,471 A | 2/1978 | McClure | |
| 4,741,154 A | 5/1988 | Eidelman | |
| RE35,172 E | 3/1996 | Clark | |
| 5,813,878 A | 9/1998 | Kuwata et al. | |
| 6,250,279 B1 * | 6/2001 | Zack | ........................ 123/241 |
| 6,341,590 B1 * | 1/2002 | Barrera et al. | .............. 123/245 |
| 6,477,829 B1 | 11/2002 | Hunter et al. | |
| 6,666,018 B2 | 12/2003 | Butler et al. | |
| 6,725,646 B2 | 4/2004 | Callas et al. | |
| 6,883,302 B2 | 4/2005 | Koshoffer | |
| 2006/0196464 A1 * | 9/2006 | Conners | ..................... 123/204 |

OTHER PUBLICATIONS http://conceptengine.tripod.com/conceptengine/id2.html.
http://en.wikipedia.org/wiki/Pulse detonation engine.

* cited by examiner

*Primary Examiner*—Michael Cuff
*Assistant Examiner*—Phutthiwat Wongwian
(74) *Attorney, Agent, or Firm*—Ramon D. Foltz (57) ABSTRACT

A rotary piston engine having a housing defining an unobstructed circular toroidal chamber, a toroidal segment piston in said chamber, a detonation chamber having an outlet substantially tangential to the outer diameter of said toroidal chamber wherein said piston is driven in a continuous circular orbit by energy derived from pulse-detonation generated shock wave and pulse-jet gas flow.

7 Claims, 8 Drawing Sheets

ROTARY PISTON ENGINE

FIELD OF INVENTION

This invention relates to a rotary piston engine. More specifically, this invention relates to a pulse-jet or pulse-detonation rotary engine.

BACKGROUND OF INVENTION

Rotary piston internal combustion engines require fewer parts than reciprocating piston engines. However, to achieve complete circular rotary piston movement, it has been necessary to provide reaction plates that were moved in and out of a toroidal cylinder to provide a reaction for expanding combustion gases to provide a force for moving the piston and allow the piston to pass. Such engines are difficult to manufacture and are not common.

Many so-called "rotary" piston engines are engines where the pistons reciprocate over a part of a circle and do not rotate through a full circular arc.

Among the best known prior art Otto cycle internal combustion engine with a continuously orbiting and rotating piston is known as the Wankel engine. The concept was known for many years, but the Wankel engine was first operated successfully by Felix Wankel. A Wankel engine is shown in U.S. Pat. No. 2,988,008 issued Jun. 13, 1961 to F. Wankel ("the Wankel patent"). The Wankel patent relates to an engine having a peritrochoidal housing where the inner surface of the housing encloses and provides support and guidance for a generally triangular piston in an eccentric orbit. During orbiting of the piston, the piston center describes a circular orbit about the center of rotation of an output shaft. The eccentric motion of the center of the piston in relation to the center of rotation of the output shaft is used to drive a crankshaft that generates a circular rotation of the output shaft.

Other types of rotary piston engines are shown in U.S. Pat. Nos. 1,687,511 issued Oct. 16, 1928 to Powell ("the Powell patent") and 4,076,471 issued Feb. 28, 1978 to McClure ("the McClure patent"). Unlike the Wankel engine, the engines shown in the Powell and McClure patents have pistons that rotate through 360 degrees. The Powell and McClure patents are Otto cycle engines using a gaseous or vaporized liquid fuel with inlet, compression, combustion and exhaust cycles. The Powell and McClure patents require one full rotation of a piston to achieve a full Otto cycle. In the Powell patent, the pistons are supported on a rotating web that is supported for rotation by an output shaft and bearings, and are further supported in a circular toroidal "cylinder". The pistons in the Powell patent drive an output shaft.

In each of the Powell and McClure patents, a plate or valve extends into the "cylinder" to provide a reaction or "thrust" surface for containing the expanding combustion gases generated during a combustion cycle. The reaction plate surfaces are radial and perpendicular to the "axis" of the toroidal "cylinder" and are inserted in the "cylinder" to provide a reaction for the combustion gases and are removed from the "cylinder" to allow the piston to move in a complete circular path without interference. Other types of rotary engine are described and shown at the internet encyclopedia known as Wikipedia.

The pulse jet engine concept shown and described by Wikipedia is an axial flow rotary engine. In essence, a rotor is rotated in a housing thrust from pulse firing of a jet engine. The rotor is driven by momentum transfer of the jet acting on the rotor. Wikipedia describes a pulse jet engine as:

A very simple form of internal combustion engine based on jet engine principles where combustion occurs in pulses.

A fuel air mixture and a combustive spark or flame is fed through the rotor to the jet engine. The reaction to expanding and escaping combustion gas jets is used to power the rotor of the engine.

The Wikipedia description of Pulse detonation engines states:

All regular jet engines and most rocket engines operate on the deflagration of fuel, that is, the rapid but subsonic combustion of fuel. The pulse detonation engine ("PDE") is a concept currently in active development to create a jet engine that operates on the supersonic detonation of fuel.

The basic operation of the PDE is similar to that of the pulse jet engine; air is mixed with fuel to create a flammable mixture that is then ignited. The resulting combustion greatly increases the pressure of the mixture to approximately 100 atmospheres (10 MPa), which then expands through a nozzle for thrust. To ensure that the mixture exits to the rear, thereby pushing the aircraft forward, a series of shutters are used to close off the front of the engine. Careful tuning of the inlet ensures the shutters close at the right time to force the air to travel in one direction only through the engine.

The main difference between a PDE and a traditional pulsejet is that the mixture does not undergo subsonic combustion but instead, supersonic detonation. In the PDE, the oxygen and fuel combination process is supersonic, effectively an explosion instead of burning.

One of the differences between a pulse jet engine and a pulse detonation engine is in the manner in which the fuel air mixture is converted into an expanding gas. A pulse jet engine involves the deflagration or burning of the fuel air mixture whereas a pulse detonation engine uses explosive detonation of the fuel air mixture. Deflagration generates a flame front velocity that is subsonic whereas detonation generates a flame front velocity that is supersonic, i.e., Mach 5. Detonation is a substantially more powerful reaction and results in an extremely rapid type of combustion reaction where the pressure-wave created travels at super-sonic speeds.

The engine of this invention is a rotary piston engine that can use either pulse jet or pulse detonation gases as a source of motive power.

Some prior art engines combine conventional turbine jet engine technology with pulsed jet or pulsed detonation supplementation. Examples of such hybrid jet engines include U.S. Pat. Nos. 6,477,829, 6,666,018, 6,813,878 and 6,883,302. A rotary pulse detonation engine is disclosed in U.S. Pat. No. 4,741,154 issued May 3, 1988 to Eidelman and assigned to the United States of America. Another rotary pulse detonation engine is shown in U.S. Pat. No. 6,725,646 B1 to Callas et al. dated Apr. 27, 2004.

The engine of this invention is intended to operate using principles of pulse detonation, pulse jet combustion or a combination of pulse detonation and pulse jet combustion. The engine operates with a detonation or combustion cycle that includes compression of a fuel air mixture, combustion or detonation of the compressed fuel air mixture, and exhaust of the products of combustion of the fuel air mixture. In the present invention, it is possible to obtain 4 or more Otto cycles in a single revolution of a piston.

The compression of the fuel air mixture is accomplished by conventional means, i.e., a radial turbine compressor, and exhaust of the energy depleted products of combustion is achieved by natural or assisted aspiration.

Ignition of the compressed fuel air mixture is achieved using an electrically powered igniter and suitable electrical and electronic controls.

The engine of this invention may include a cooling system using a circulating fluid coolant.

The engine may also include a starter motor for initiating operation of the engine. The starter motor may, when the engine is operating, also function as a generator for providing electrical energy necessary for maintaining operation of the engine.

It is a primary object of this invention to provide a rotary piston engine that uses pulse jet or pulse detonation energy to move a piston.

Another object of the present invention is to provide a rotary piston engine having a continuous unobstructed circular path of piston travel.

Other objects and advantages of this invention will become obvious from the following detailed description of construction and operation.

SUMMARY OF THE INVENTION

This invention relates to a rotary piston engine including:

a housing defining an inlet passage including a pre-combustion chamber, a combustion/detonation chamber having an outlet passage, and a circular toroidal chamber;

a shaft mounted at the center of the toroidal chamber for rotation in said housing;

a generally circular disk extending from the toroidal chamber to said shaft and drivingly connected to said shaft;

a toroidal segment piston located in the toroidal chamber and drivingly connected to said disk, a pre-combustion chamber in fluid communication with said combustion chamber, a fuel injector located in said pre-combustion chamber;

said cylindrical combustion/detonation chamber extending substantially tangential to said toroidal chamber;

an igniter located in said combustion/detonation chamber;

a flow control valve located between said pre-combustion chamber and said combustion chamber for controlling fluid flow between said pre-combustion chamber and said combustion/detonation chamber; and controls for supplying an explosive fuel air mixture to said pre-combustion chamber and electrical energy to said igniter whereby the fuel air mixture is ignited in said combustion/detonation chamber and the resulting combustion/detonation gases impact on said piston imparting a propelling force thereto.

The combustion of the fuel air mixture can be deflagration or detonation.

DESCRIPTION OF THE PREFERRED EMBODIMENT

Figure 1:
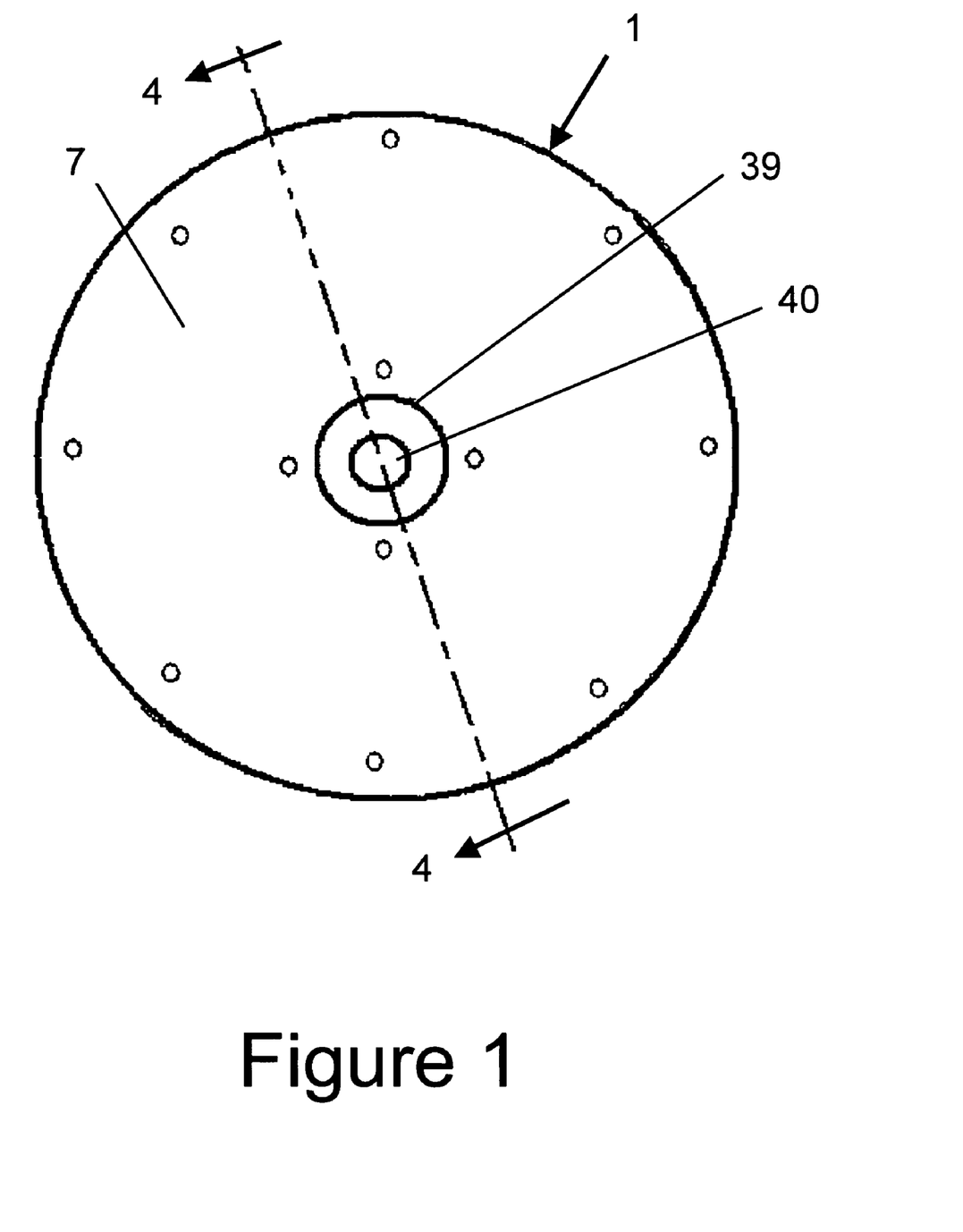
FIG. 1 is a plan view of the rotary engine.

As shown in FIG. 1, this invention is a rotary internal combustion piston engine 1. The engine 1 comprises a cylindrical housing 7, a hub and journal 39 on the housing 7 and an output shaft 40 rotatably mounted in said hub and journal 39.

Figure 2:
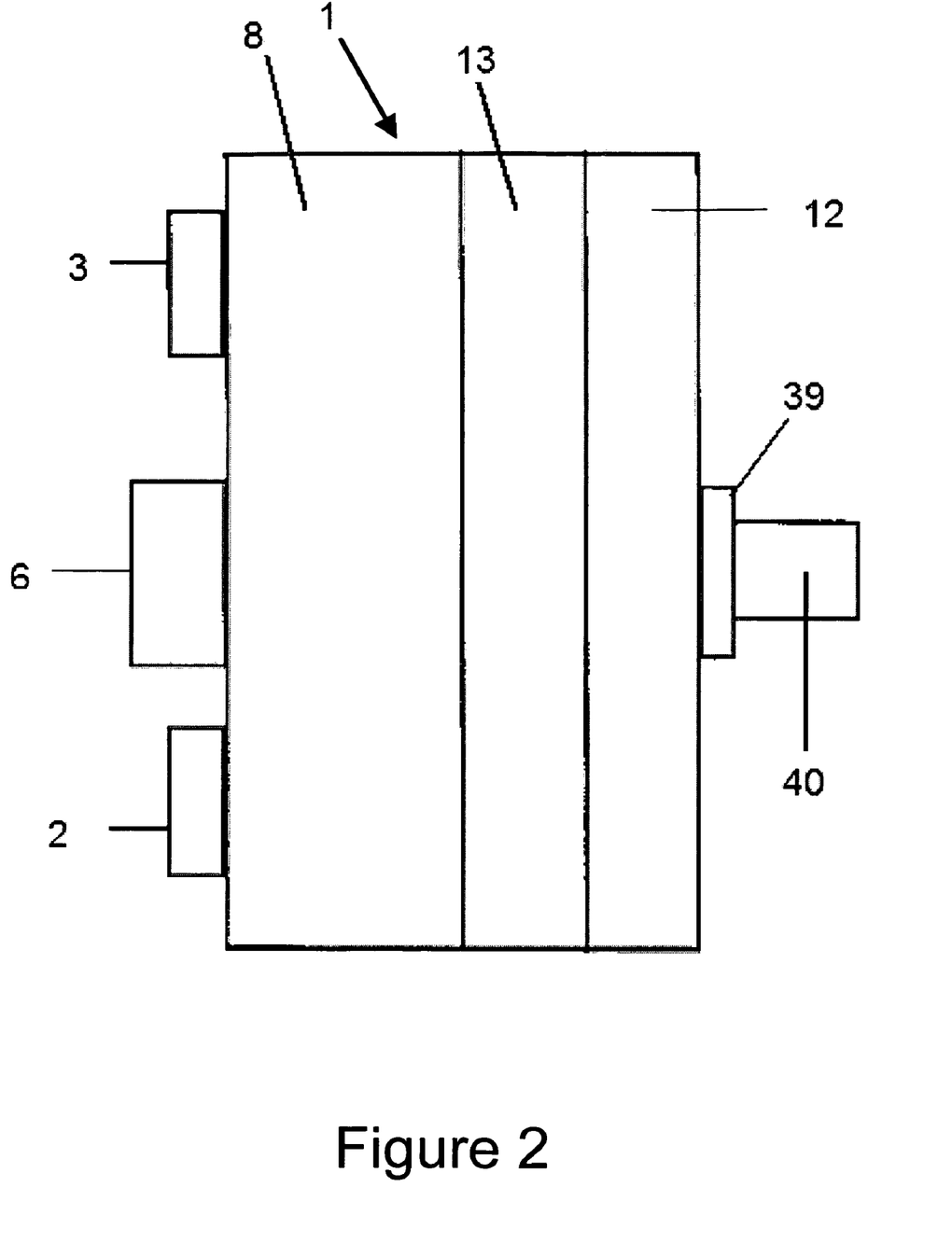
FIG. 2 is an enlarged side view of the rotary engine showing some additional structural details.

FIG. 2 is a side view of the engine 1 of FIG. 1. As seen in FIG. 2, the engine 1 includes the cylindrical housing 7, hub and journal 39 and output shaft 40 and further includes a compressor housing 8, a source of electrical energy and timing controls 2 which may include an alternator/battery combination, a fuel pump and regulator 3, and a starter motor/alternator 6.

Figure 3:
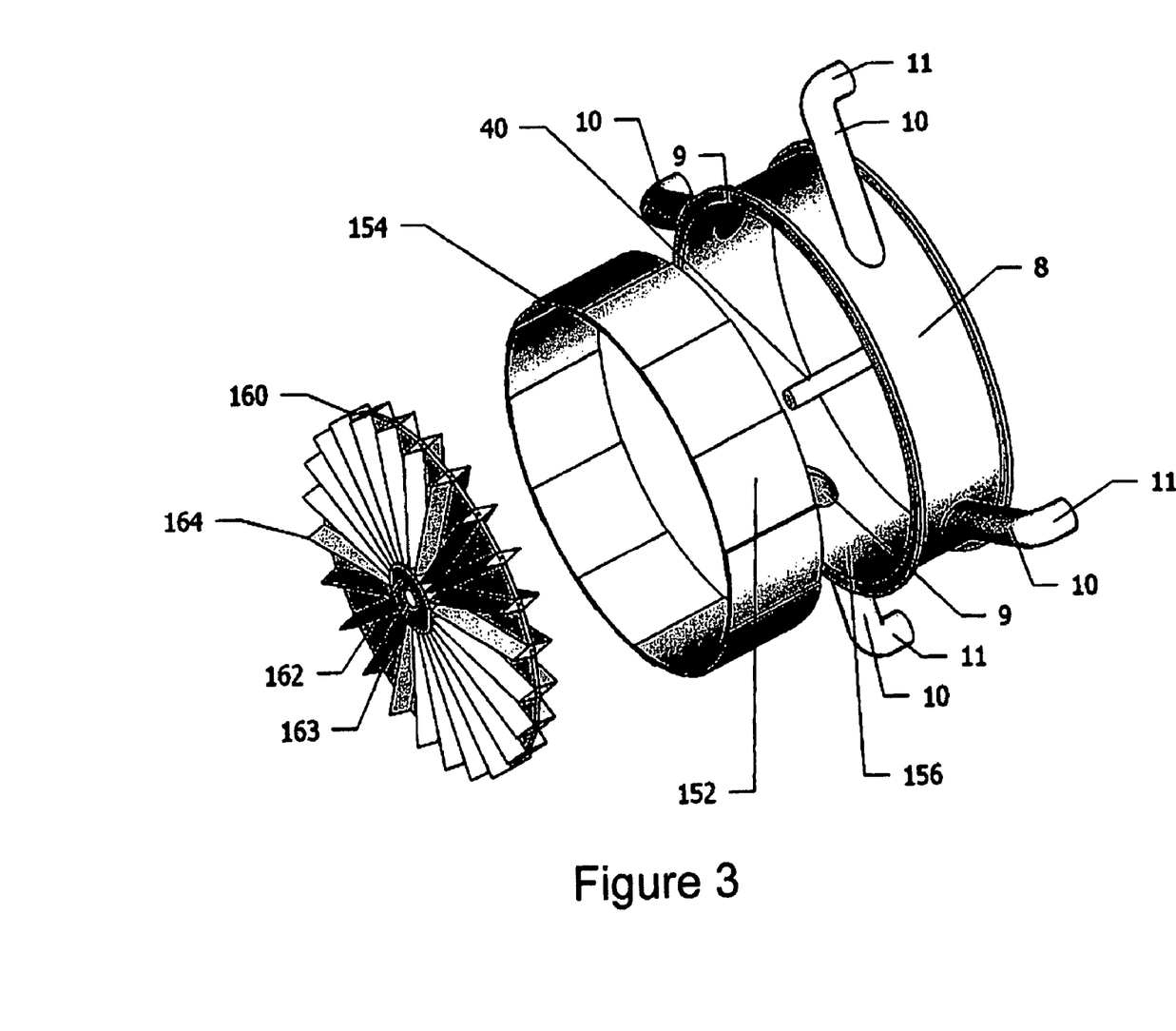
FIG. 3 is an expanded perspective view of the compressor section of the rotary engine

FIG. 3 is an expanded perspective view of the major components contained within and associated with the compressor housing 8 of the rotary engine 1. The compressor includes a diffuser 150 and an impeller 160. The impeller 160 comprises a central hub 162 defining a central through opening 163 and a plurality of radially extending turbine blades 164. The output shaft 40 extends through the impeller 160 at the central opening 163, and includes a releasable driving connection to the starter motor 6. The impeller hub 162 is fixed to the output shaft 40 for rotation therewith. As is well known in connection with internal combustion engines, the starter motor 6 is used to provide initial rotation of the engine components until the engine is running under the influence of fuel combustion.

The diffuser 150 is generally cylindrical and comprises a plurality of arcuate plates 152. The plates 152 overlap and define openings 154 therebetween that are generally tangential to the internal surface 156 of the compressor housing 8. The openings 154 diffuse and convert the velocity of the air flowing from the turbine blades 164 into a quiescent pressurized fluid.

The compressor housing 8 includes a plurality of outlets 9 and fluid conducting conduits 10 and 11. The conduits 10 and 11 convey the pressurized air from the compressor to the engine housing as hereinafter described.

Figure 4:
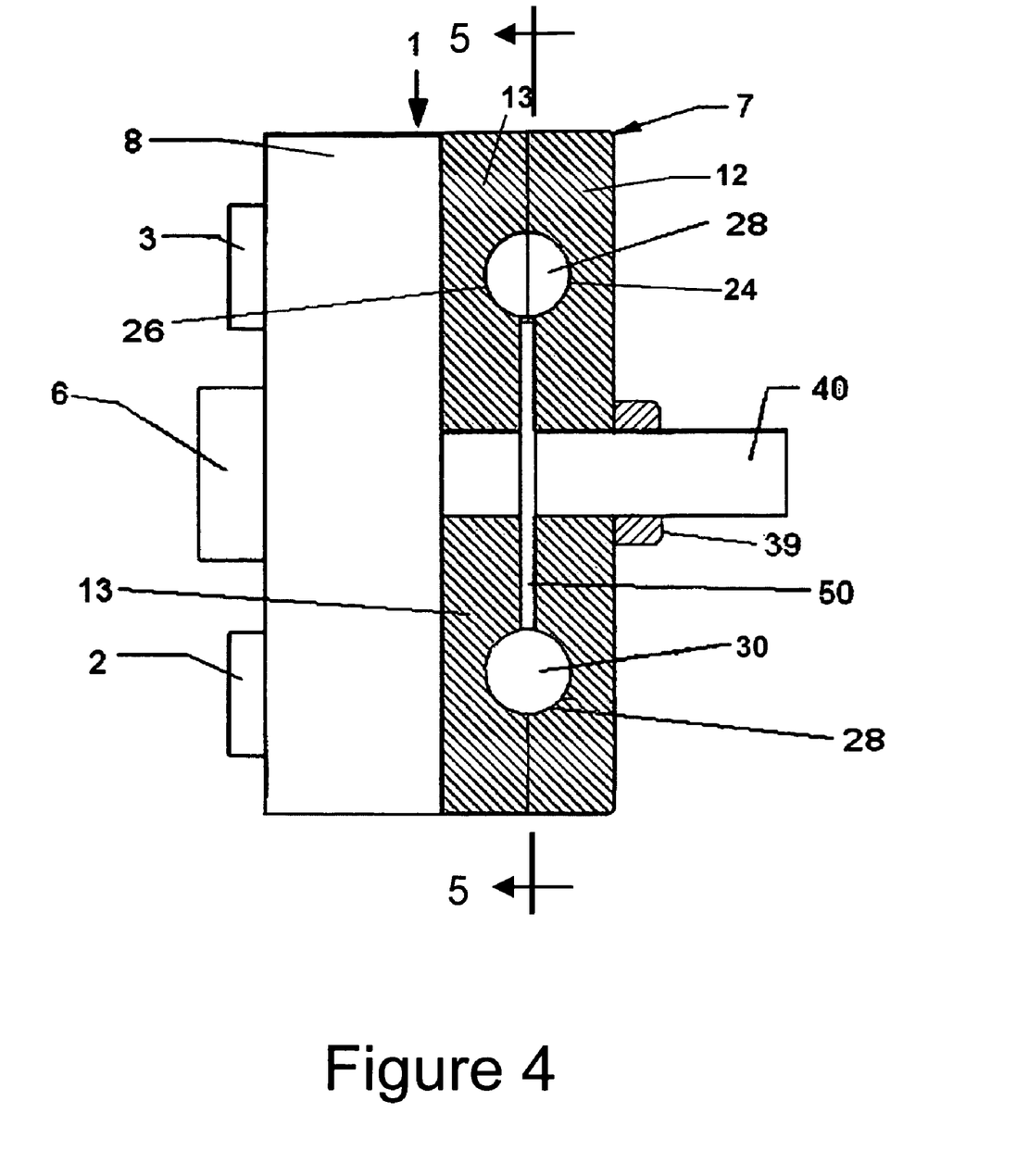
FIG. 4 is a partial sectional view of the engine of FIG. 1 taken along the line 4-4 of FIG. 1.

In FIG. 4, the engine 1 is shown in section through the engine housing 7. The compressor housing 8, igniter control 2, fuel injection control 3 and starter motor/alternator 6 are shown in plan view. The engine housing 7 comprises a first housing member 12 and a second housing member 13. Housing member 12 includes an arcuate groove 24 that is generally semi-circular in cross-section and extends in a circle around the housing member 12. Housing member 13 includes a mirror image arcuate groove 26 that is generally semi-circular in cross-section and extends in a circle around the housing member 13. As shown in FIG. 4, when the housing members 12 and 13 are mated face to face, the grooves 24 and 26 define a circular toroidal chamber 28 in the engine housing 7.

Also, FIG. 4 shows a generally circular disk 50 fixed to the output shaft 40. A piston 30 is located in the toroidal chamber 28. The engine 1 may contain one or more pistons 30 equally spaced around the periphery of the disk 50. The pistons 30 are constructed, i.e., forged or cast, as one piece from aluminum, ceramic, steel or other suitable material or alloy. The pistons 30 are drivingly connected to the disk 50.

Figure 5:
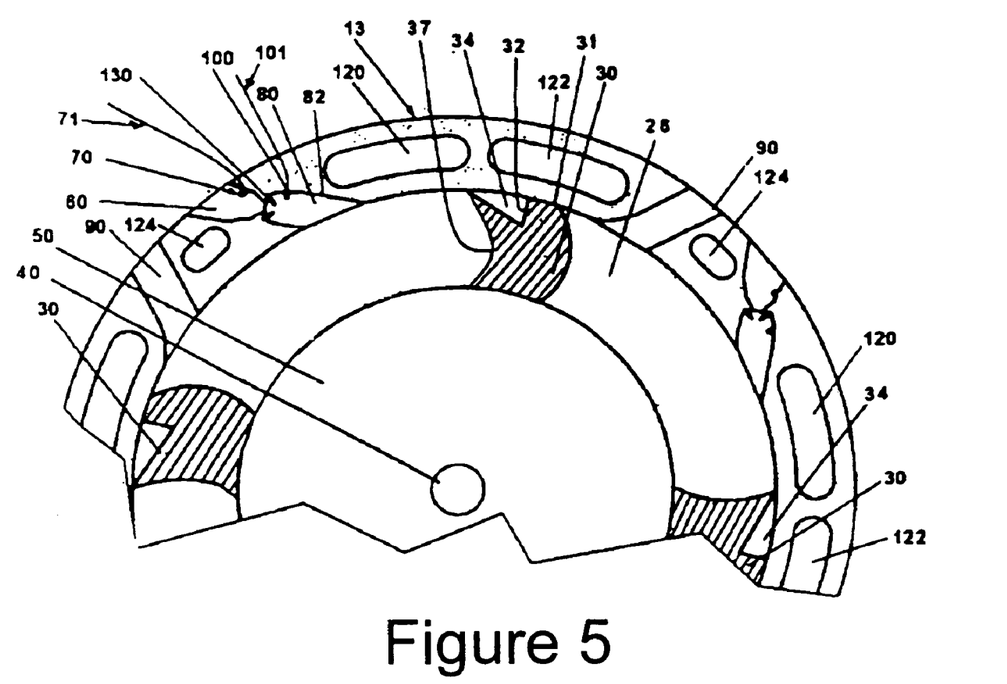
FIG. 5 is a partial sectional view of the engine of FIG. 4 taken along the line 5-5.

In FIG. 5, additional details of the engine housing member 13, pistons 30, disk 50 and output shaft 40 are shown. The engine-housing member 13 includes radially spaced engine cooling passages 120, 122, and 124 and exhaust passages 90. Also, the engine-housing members 12 and 13 define radially spaced pre-combustion chambers 60. The pre-combustion chambers 60 include fuel injectors 70. Flow controlling inlet valves 130 are located at one end of the pre-combustion chambers 60 and allow flow of the compressed air-fuel mixture into cylindrical combustion/detonation chambers 80 which are also defined by the engine housing members 12 and 13. Igniters 100 for igniting the fuel air mixture are located in each of the combustion/detonation chambers 80.

Fuel lines 71 provide fuel from the fuel pump and regulator 3 to the injector 70 and electrical conductors 101 provide electrical current from the electrical energy and timing controls 2 to the igniters 100.

Also shown in FIG. 5, the engine-housing members 12 and 13 have spaced sets of cooling passages 120, 122, and 124, and arcuate grooves 26 and 27 which define the toroidal chamber 28. The pistons 30 are located in the toroidal chamber 28 defined by the grooves 26 and 27 and equally spaced circumferentially therein.

In the embodiment of the invention shown in FIG. 5, the pistons 30 include a generally cylindrical bore or chamber 32 including a reaction surface 34 and a concave gas flow reaction surface 37. The pistons 30 also include a surface 31 located before the chamber 32. As described above in respect of FIG. 4, the pistons 30 are drivingly connected to the disk 50 which is drivingly connected to the output shaft 40.

Figure 6:
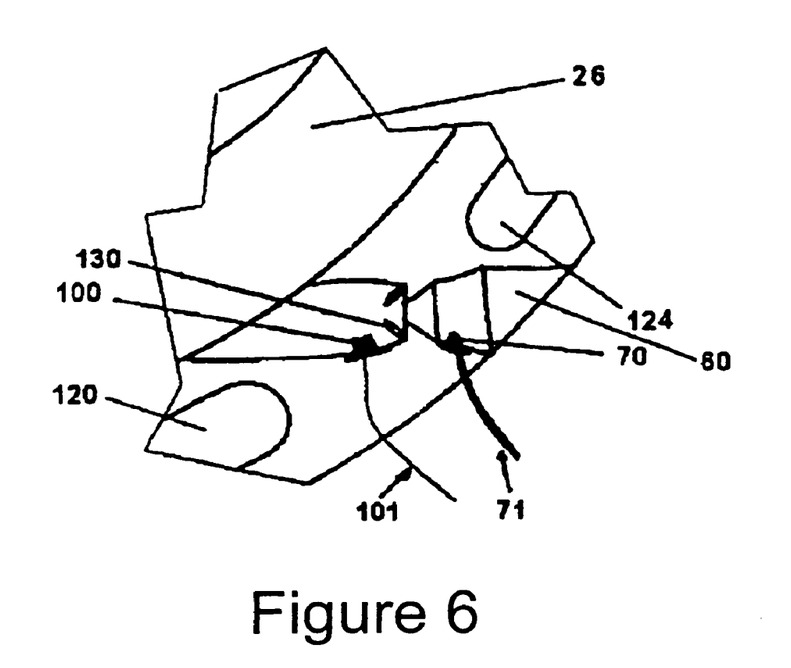
FIG. 6 is an enlarged partial sectional view showing further details of the piston engine shown in FIGS. 4 and 5.

FIG. 6 shows in greater detail a portion of the engine-housing member 13, the pre-combustion chamber 60, fuel injector 70, inlet valve 130, combustion/detonation chamber 80 and igniter 100.

Figure 7:
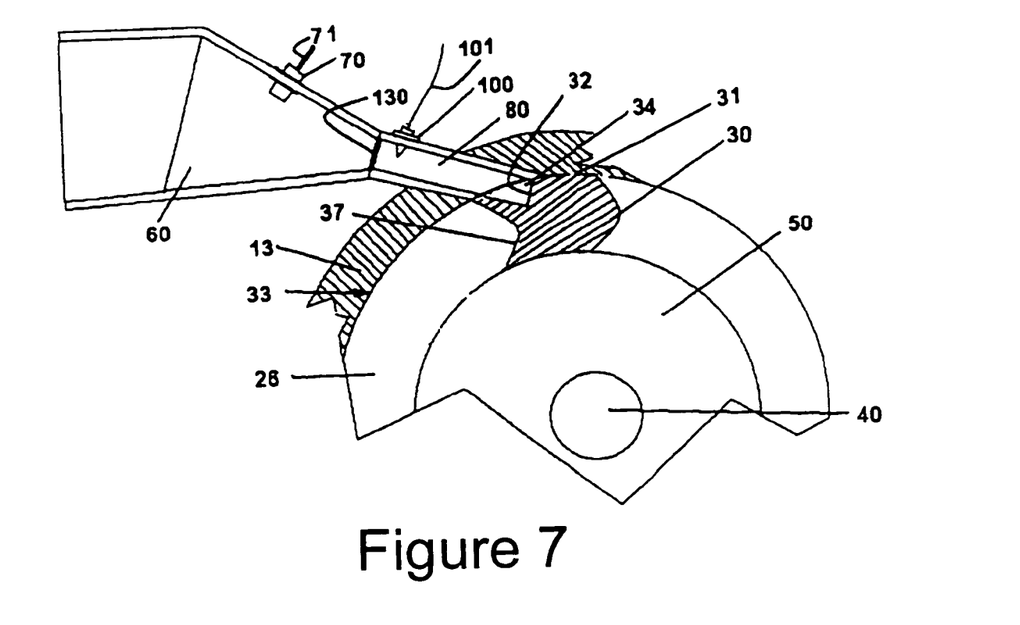
FIG. 7 is a partial sectional view of the engine similar to FIG. 5 showing a piston in a first operating position.

FIG. 7 is a partial sectional view taken along the line 4-4 of FIG. 3 and shows the piston 30 in a first position with respect to the combustion/detonation chamber 80. In FIG. 7, the piston 30 is shown in a position where the cylindrical bore 32 is axially aligned with the axis of the cylindrical bore 80 defined by housing members 12 and 13.

Figure 8:
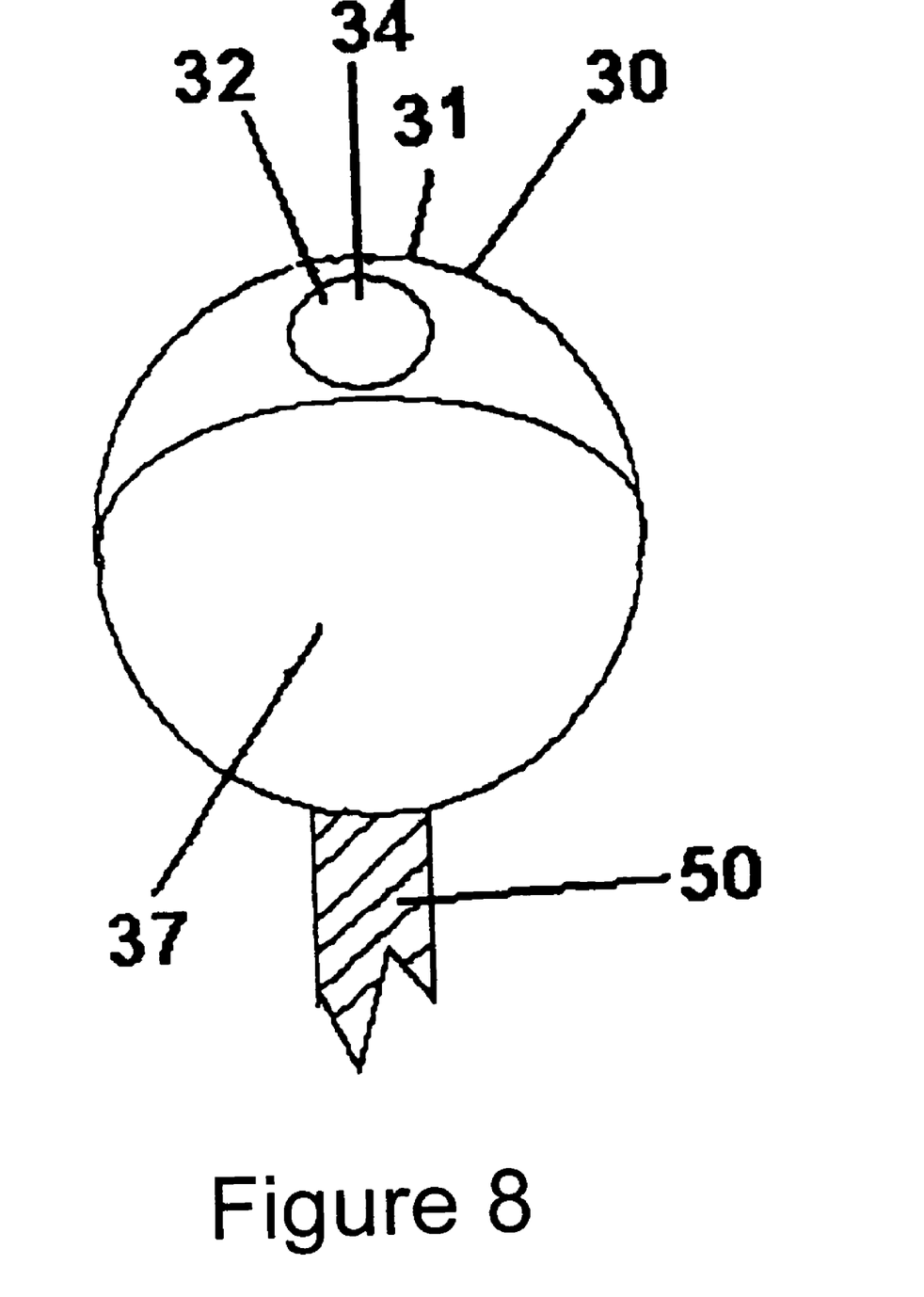
FIG. 8 is a rear plan view of the piston of FIG. 5.

FIG. 8 is a plan view of the piston 30 showing the cylindrical bore 32, combustion/detonation reaction surface 34 and gas flow reaction surface 37. In FIG. 8, the piston 30 is shown attached to the disk 50.

Figure 9:
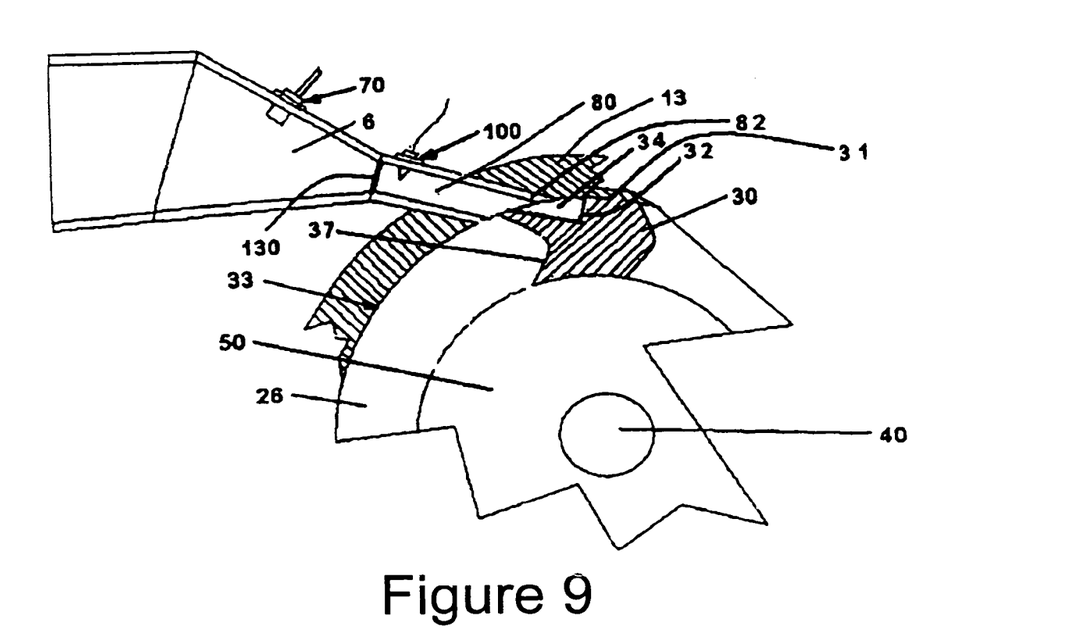
FIG. 9 is a partial sectional view similar to FIG. 7 showing a piston in a second operating position.

FIG. 9 is a partial sectional view similar to FIG. 7 taken along the line 4-4 of FIG. 3 and shows the piston 30 in a second position with respect to the combustion/detonation chamber 80. In FIG. 9, the piston 30 is rotated slightly clockwise from the first position shown in FIG. 7. In the second position, the combustion/detonation chamber 80 is open to gas flow reaction surface 37.

Figure 10:
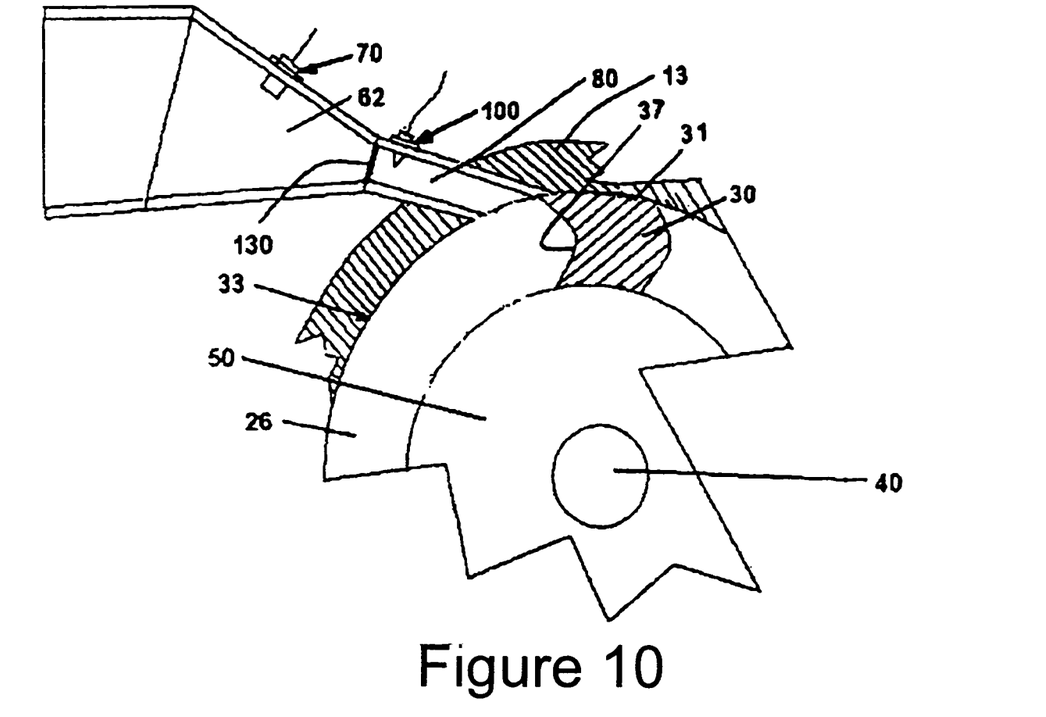
FIG. 10 is a partial sectional view similar to FIG. 7 with an alternative piston in a first operating position.

FIG. 10 is a partial sectional view similar to FIG. 9 taken along the line 4-4 of FIG. 3 showing an alternative design for piston 30. In FIG. 9, the piston 30 has a gas flow reaction surface 37, but does not include a combustion/detonation chamber.

Figure 11:
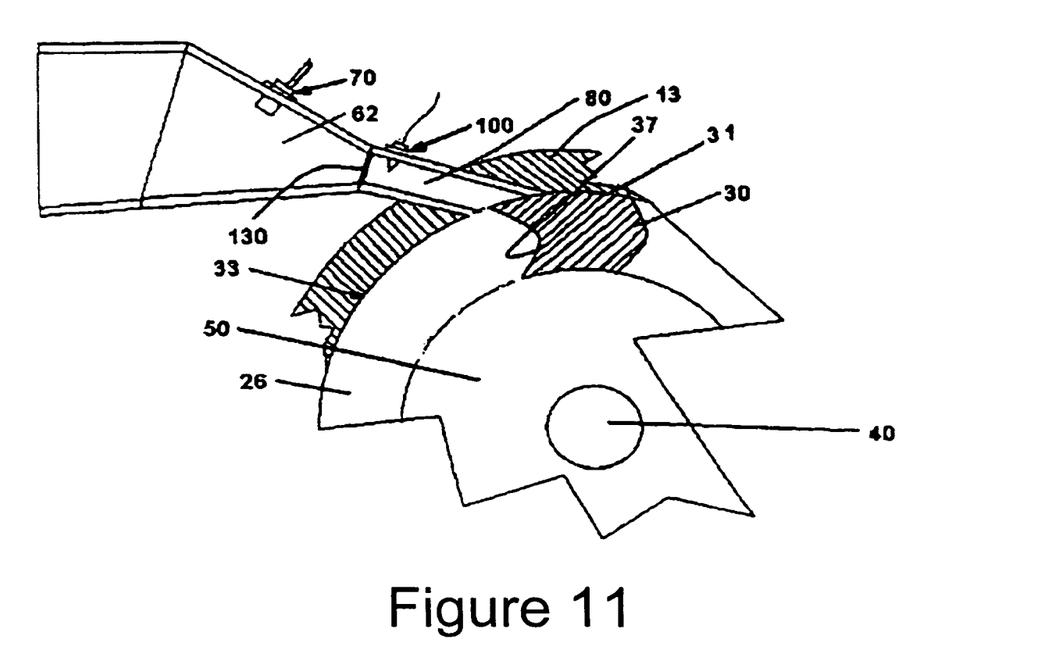
FIG. 11 is a partial sectional view similar to FIG. 10 with the alternative piston of FIG. 10 in a second operating position.

FIG. 11 is a partial sectional view similar to FIG. 10 taken along the line 4-4 of FIG. 3 showing the alternative design for piston 30 in a second operating position.

Description of Operation

The main difference between a pulse detonation engine and traditional pulse jet engine is the way in which the airflow and combustion in the engine is controlled. In the pulse detonation engine the combustion process is supersonic, effectively an explosion instead of burning, and the shock wave of the combustion front inside the fuel serves the purpose of the shutters of a pulse jet. When the shock wave reaches the rear of the engine and exits the combustion products are ejected in essentially a "one go", the pressure inside the engine suddenly drops, and air is pulled in the front of the engine to start the next cycle. Some designs require valves to make this process work properly.

The engine 1 of this invention operates using detonation, combustion (deflagration) or a combination of detonation and combustion. The engine 1 operates with a detonation or combustion cycle that includes compression of a fuel air mixture, combustion or detonation of the compressed fuel air mixture, and exhaust of the products of combustion of the fuel air mixture. The compression of the fuel air mixture is accomplished by conventional means, i.e., a radial turbine compressor, and exhaust of the products of combustion is achieved by natural aspiration. Ignition of the compressed fuel air mixture is achieved using an electrically powered igniter. The engine 1 may include a cooling system using a circulating fluid coolant. The engine may include a starter motor for initiating operation of the engine 1 which may also serve as an alternator/generator for providing electrical energy for maintaining operation of the engine 1. The exhaust of the gases of combustion can be achieved by aspiration or use of a purge gas.

In FIG. 1, the engine 1 is shown as having a substantially cylindrical shape. However, the exterior configuration of the engine 1 is not relevant to operation and the exterior of the engine 1 can have any desired shape or configuration.

Referring to FIGS. 2, 3 and 4, the engine 1 accepts rotary power input from a starter motor 6 and delivers rotary power output through an input/output shaft 40. The starter motor 6 is a high power, high speed mechanism capable of driving the output shaft and engine components at 10,000 rpm or greater.

Thus, when energized with electrical energy and actuated the starter motor/generator 6 acts as a motor and drives the output shaft 40, impeller hub 162, turbine blades 164 and other engine components including the disk 50 and pistons 30 to a speed where operation of the engine as an internal combustion engine can begin.

When the engine 1 is operating, the electrical energy to the starter motor 6 is terminated and the output shaft 40 drives the starter motor 6. When the motor 6 is driven by the engine 1, the motor 6 becomes a generator of electrical energy. The electrical energy from the motor/generator 6 can be used to supply electrical energy to the fuel pump and regulator 3, igniter 100, an electrical energy storage battery (not shown), and other electrical accessories and devices associated with the engine 1 all as is well known in the art. The rotating turbine blades 164 pump air from the atmosphere radially outwardly of the hub 162. The arcuate plates 152 of the diffuser 150 convert high velocity air flowing from the turbine blades 164 into higher pressure, lower velocity air that is supplied to the engine 1 to support combustion or detonation. The pressurized air passes from the compressor housing 8 through outlet openings 9 into outlet conduits or tubes 10, 11 to the pre-combustion chambers 60.

When the starter motor 6 reaches a predetermined engine speed fuel flow from the fuel pump and regulator 3 to a fuel injector 70 (FIG. 5 and subsequent) located in engine housing member 7 is begun, and the source of electrical energy and timing controls 2 deliver electrical energy to an electrically actuated igniter 100 shown in FIG. 5 and subsequent sheets of the drawing.

The pistons 30 of the engine 1 are segments of a toroid. The pistons 30 are generally circular in cross-section and arcuate in plan view having a curvature that matches the toroidal chamber 28 defined by engine members 12 and 13. The inner radius of the pistons 30 also matches the outer periphery of the rotor disk 50 to which the pistons 30 are attached. The pistons 30 fit closely in the toroidal chamber 28 but run in the toroidal chamber 28 without interference and may include a gas seal (not shown) between the inner surface of the toroidal chamber 28 and the outer diameter of the piston 30.

The engine 1 can have a varying number of pistons 30. The number of pistons 30 can vary from one to four or more. The pistons 30 are designed to run in a toroidal chamber 28 in a complete, 360-degree, circle. The design of the engine 1 reduces vibration over most prior art rotary engines because the pistons 30 travel in a circular orbit about the center of rotation of the output shaft 40. Hence, static and dynamic balance is easily obtained by proper distribution of the pistons 30 around the periphery of the disk 50. The pistons 30 are drivingly connected to the disk 50.

As will be described in greater detail, the mechanics behind the driving of the pistons 30 are in some embodiments of the invention, closely related to the principles of operation of a gas turbine engine. In other embodiments, the pistons 30 are driven by pulse detonation or pulse jet principles.

The engine 1 is designed such that the pistons 30 run at a speed producing a governed rotary velocity of between 30,000 and 35,000 rpm of the disk 50 and output shaft 40. The disk 50 is shown as connected to and directly driving the output shaft 40. Both the disk 50 and the compressor 160 are drivingly connected to the output shaft 40.

As described above, the engine 1, can be started by the electric starter motor 6 which rotates the disk 50 and the pistons 30 until the engine 1 is running under power provided by combustion or detonation of the fuel air mixture and becomes self-governed.

The starter motor 6 drives the shaft 40, compressor hub 162 and compressor turbine blades 164. Rotation of the turbine blades 164 produces a radial airflow and forces such air into contact with a diffuser 150. The diffuser 150 converts the high velocity air flow from the turbine blades 164 into lower speed, higher pressure air. The compressed air from the diffuser 150 is directed by outlets 9 and conduits 10 and 11 to a fluid flow passage in engine housing 12 and 13. The passage includes a pre-combustion chamber 60, cylindrical combustion/detonation chamber 80, toroidal chamber 28 and exhaust outlet 90. The pre-combustion chamber 60 is separated from the combustion/detonation chamber 80 by a directional flow control valve 130.

The flow control valve 130 may comprise any suitable mechanical or fluidic one way flow control valve mechanism. The flow control valve 130 is allows the flow of a pressurized fuel air mixture into the combustion/detonation chamber 80 and prevents the flow of combustion gases from the combustion/detonation chamber 80 into the pre-combustion chamber 60.

The combustion chamber 80 includes an igniter 100 which may be "continuously on" or intermittently firing depending on whether the engine is operated as a gas turbine, pulse jet or pulse detonation engine. The purpose of the igniter 100 is to ignite the fuel-air mixture entering the combustion/detonation chamber 80 from the pre-combustion chamber 60.

Referring to FIGS. 5 and 7, to activate the engine 1, starter motor/generator 6 rotates the shaft 40 causing rotation of the compressor 160, pumping air into the diffuser 150 and to the engine 1 through the outlets 9 and conduits 10 and 11 that connect the compressor housing 8 and the engine housing 7. The pressurized air enters the engine 1 through the pre-combustion chamber 70. Fuel is released from the fuel injector 150 into the pressurized air in pre-combustion chamber 70. The flow control valve 130 is opened and admits the pressurized fuel air mixture into the combustion/detonation chamber 80. As the compressed fuel air mixture enters the combustion/detonation chamber 80, the forward surface 31 of the piston 30 blocks the flow of the compressed fuel air mixture thereby trapping the pressurized fuel air mixture.

After the fuel-air mixture has entered the combustion chamber 80 and with the piston 30 still blocking the fuel air mixture in the combustion/detonation chamber 80, the control valve 130 closes and the igniter 100 is activated by electrical current provided through an electronic ignition timing control 3.

Upon ignition, the fuel-air mixture burns or detonates creating a gas with a rapidly increasing pressure in the combustion/detonation chamber 80. The increasing pressure in the combustion/detonation chamber 80 can be used directly to act on the check valve 130 and cause the check valve 130 to close preventing the flow of gases and flame back into the pre-combustion chamber 60 and beyond. Alternatively, the actuation of the igniter 100 can be used to actuate known mechanical or electromechanical apparatus (not shown) for closing the check valve 130.

FIGS. 5 and 7 illustrate pistons 30 that are designed to operate on pulse detonation principles, pulse jet principles, or a combination of pulse detonation and pulse jet principles. The pistons 30 have the cylindrical chamber 32 and concave turbine blade surface 37.

The axis of combustion/detonation chamber 80 is aligned with the axis of the cylindrical chamber 32 and the reaction surface 34 is preferably perpendicular to the axis of the cylindrical chamber 32.

The axes of the combustion/detonation chamber 80 and the cylindrical chamber 32 are substantially tangential to the middle diameter of the toroidal chamber 28 to provide a maximum of forward force and thrust to the piston 30 through the reaction wall 34.

When the piston 30 reaches the position in the toroidal chamber 28 shown in FIG. 8, either under the influence of the starter/generator motor 6 or as a running engine condition, the fuel air mixture is admitted to the combustion/detonation chamber 80 and ignited. The surface 31 on piston 30 temporarily blocks the flow of gases from the combustion/detonation chamber 80. As the piston 30 moves clockwise from the position of FIG. 8 and the high velocity, pressurized gas jet impacts upon and flows over the concave (turbine blade) surface 37 of the piston 30 transferring additional energy to the piston 30 by momentum exchange and propelling the piston 30 further in the clockwise direction. As the piston 30 passes an outlet port 90 pressurized gases remaining behind the piston 30 are vented to the atmosphere to exhaust the spent gases of combustion. The exhaust process can be assisted by the addition of a purge gas if desired.

When the engine 1 is operating using pulse detonation principles, the detonation of explosive fuel air mixture in the combustion chamber 80 is timed to occur as or just before the piston 30 reaches the position shown in FIG. 8, i.e., so that the impulse from the exploding fuel air mixture enters the chamber 34 when the cylindrical chamber 32 is precisely aligned with the combustion chamber 80. When ignited, detonation of the fuel air mixture occurs, the fuel air mixture explodes and the highly pressurized, rapidly expanding gas is used either directly or as a signal to close the check valve 130 and moves into the cylindrical chamber 32 and impacts against the reaction surface 34.

The explosive pulse transfers energy to the piston 30 through an impulse of impact and propels the piston 30 in a clockwise direction as shown in FIG. 9. The principles of pulse detonation energy transfer are further explained in the above referenced Wikipedia article.

As the piston 30 moves from the position shown in FIG. 7 to the position shown in FIG. 9 and beyond, the flow of any remaining high pressure, high velocity gas from combustion/detonation chamber 80 acts on the concave surface 37 of piston 30. The flow of high velocity flow gases of combustion on the arcuate concave surface 37 results in a transfer of additional energy from the gases of combustion to the piston and further propels the piston 30 in a clockwise direction.

The power generated by the power cycle turns the compressor 160 allowing the compression, injection, combustion/detonation, and exhaust cycle to be repeated.

As the piston 30 moves along the toroidal chamber 28, it passes exhaust port 90 which allows the remaining pressurized gases to escape or be purged from the toroidal chamber 28 to the atmosphere.

It is possible to have 2, 3, 4 or more power strokes per piston 30 per revolution by having the appropriate number of pre-combustion chambers 60, inlet valves 130, combustion/detonation chambers 80, pistons 30, and exhaust ports 90 that are designed into the engine 1.

It is also possible to operate the embodiment of FIGS. 7 and 9 using either pulse detonation or pulse jet principles.

FIGS. 10 and 11 illustrate an alternative embodiment of the invention. The piston 30 shown in FIGS. 10 and 11 has a concave reaction surface 37. When the piston 30 reaches the position in the toroidal chamber 28 shown in FIG. 10, either under the influence of the starter/generator motor 6 or as a running engine-condition, the fuel air mixture is admitted to the combustion/detonation chamber 80 and ignited. The surface 31 on piston 30 temporarily blocks the flow of gases from the combustion/detonation chamber 80. As the piston 30 moves clockwise from the position of FIG. 10 and the high velocity, pressurized gas jet impacts upon and flows over the concave (turbine blade) surface 37 of the piston 30 transferring energy by momentum exchange to the piston 30 and propelling the piston 30 further in the clockwise direction. As the piston 30 passes an outlet port 90 any remaining pressurized gases behind the piston 30 are vented to the atmosphere. As with the previously described embodiment of the invention, the embodiment of FIGS. 10 and 11 may have 2, 3, 4 or more pistons 30 each of which operates as herein described.

In either embodiment of the invention, the pistons 30 can be powered in sequential order or simultaneously. Additionally, in the case of having multiple pistons 30, all or less than all can be powered during any revolution or portion thereof to achieve any combination of power.

Having described my invention, I now claim:

1. A rotary orbiting piston pulse detonation engine including:
    a housing defining
        a pre-combustion chamber,
        a detonation chamber in fluid communication with said pre-combustion chamber;
        a first outlet from said detonation chamber,
        a circular toroidal chamber in fluid communication with said first outlet said first outlet having an axis extending substantially tangential to an internal surface of said toroidal chamber; and
        a second outlet providing fluid communication from said toroidal chamber with the atmosphere;
    a shaft mounted for rotation in said housing;
    a rotor located in said housing extending from the toroidal chamber to said shaft and drivingly connected to said shaft;
    a toroidal segment piston located in the toroidal chamber and drivingly connected to said rotor;
    a fuel injector in said pre-combustion chamber;
    an igniter in said detonation chamber;
    a one-way flow control valve located between said pre-combustion chamber and said detonation chamber allowing fluid flow from said pre-combustion chamber to said detonation chamber; and
    controls for supplying an explosive fuel air mixture to said injector and pre-combustion chamber and electrical energy to said igniter for igniting the explosive fuel air mixture in said detonation chamber creating a shock wave impacting said piston.

2. The engine of claim 1 wherein the piston includes a chamber, said chamber having an open end aligned with the axis of said first outlet and closed end forming a reaction surface.

3. The engine of claim 1 further comprising a compressor for supplying pressurized air to said pre-combustion chamber.

4. The engine of claim 2 wherein said reaction surface is radial to the center of rotation of said shaft.

5. The engine of claim 3 wherein the piston includes an arcuate concave surface located adjacent to the open end of the chamber formed by the bore.

6. A rotary orbiting piston pulse detonation engine including:
    a housing defining
        a pre-combustion chamber,
        a detonation chamber in fluid communication with said pre-combustion chamber;
        a first outlet from said detonation chamber,
        a circular toroidal chamber in fluid communication with said first outlet said first outlet having an axis extending substantially tangential to an internal surface of said toroidal chamber; and
        a second outlet providing fluid communication from said toroidal chamber with the atmosphere;
    a shaft mounted for rotation in said housing;
    a rotor located in said housing extending from the toroidal chamber to said shaft and drivingly connected to said shaft;
    a toroidal segment piston located in the toroidal chamber and drivingly connected to said rotor, said piston including a concave reaction surface;
    a source of pressurized air in fluid communication with said precombustion chamber;
    a fuel injector in said pre-combustion chamber;
    an igniter in said detonation chamber;
    a one-way flow control valve located between said pre-combustion chamber and said detonation chamber allowing fluid flow from said pre-combustion chamber to said detonation chamber; and
    controls for supplying an explosive fuel air mixture to said injector and pre-combustion chamber and electrical energy to said igniter for igniting the explosive fuel air mixture in said detonation chamber creating a shock wave impacting said piston and expanding gases flowing over said concave reaction surface.

7. The engine of claim 6 further comprising a compressor for supplying pressurized air to said pre-combustion chamber.

* * * * *